(12) United States Patent
Dewael et al.

(10) Patent No.: US 8,324,298 B2
(45) Date of Patent: Dec. 4, 2012

(54) COMPOSITION OF AT LEAST ONE VINYLIDENE CHLORIDE POLYMER

(75) Inventors: Pascal Dewael, Buvrinnes (BE); Christophe Fringant, Tavaux (FR); Yves Vanderveken, Heverlee (BE)

(73) Assignee: Solvay (Societe Anonyme), Brussels (BE)

( * ) Notice: Subject to any disclaimer, the term of this patent is extended or adjusted under 35 U.S.C. 154(b) by 713 days.

(21) Appl. No.: 12/438,770

(22) PCT Filed: Sep. 4, 2007

(86) PCT No.: PCT/EP2007/059254
§ 371 (c)(1),
(2), (4) Date: Mar. 12, 2009

(87) PCT Pub. No.: WO2008/028915
PCT Pub. Date: Mar. 13, 2008

(65) Prior Publication Data
US 2010/0135601 A1    Jun. 3, 2010

(30) Foreign Application Priority Data
Sep. 5, 2006 (FR) ..................................... 06 07798

(51) Int. Cl.
*C08K 5/1515* (2006.01)
(52) U.S. Cl. ......... 524/114; 524/313; 524/502; 524/539
(58) Field of Classification Search .................... 525/80; 524/114, 313, 502, 539
See application file for complete search history.

(56) References Cited

U.S. PATENT DOCUMENTS

| | | | |
|---|---|---|---|
| 3,274,143 A | 9/1966 | Hostettler et al. | |
| 3,592,877 A * | 7/1971 | Mullins et al. ................ | 525/186 |
| 3,762,979 A | 10/1973 | Hanel et al. | |
| 3,800,006 A | 3/1974 | Katayama et al. | |
| 3,904,579 A | 9/1975 | Braddicks | |
| 4,791,189 A | 12/1988 | Yu | |
| 4,826,934 A | 5/1989 | Malfroid et al. | |
| 4,889,892 A | 12/1989 | Malfroid et al. | |
| 5,759,702 A * | 6/1998 | Bekele .......................... | 428/518 |
| 5,969,031 A | 10/1999 | Ruckenstein et al. | |

FOREIGN PATENT DOCUMENTS

| | | | |
|---|---|---|---|
| CN | 1183111 A | 5/1998 | |
| EP | 0264982 A1 | 4/1988 | |
| EP | 0281649 A1 | 9/1988 | |
| EP | 281649 A1 * | 9/1988 | |
| EP | 1698459 A1 | 9/2006 | |
| FR | 2288120 | 5/1976 | |
| FR | 2872166 A1 | 12/2005 | |
| GB | 914252 | 1/1963 | |
| GB | 1518324 | 7/1978 | |
| GB | 2344595 A | 6/2000 | |
| WO | WO 9634050 A1 | 10/1996 | |
| WO | W00036009 A1 | 6/2000 | |

OTHER PUBLICATIONS

Machine translation of EP 281649 A1.*
E.M.Woo, J.W.Barlow, D.R.Paul., "Miscible blends of a vinylidene chloride-vinyl chloride copolymer with aliphatic polyesters"—Journal of Applied Polymer Science—vol. 1983, 28 (4) pp. 1347-1360.
A.Garton, FTIR of polycaprolactone-PVDC-co-acrylonitryle miscible blends—A.Garton Journal of Polymer Science, Polymer Letters Edition—1983, vol. 21 (1) pp. 45-47.
M. Aubin, Y. Bedard, MF.Morrissette, R.E. Prud'Homme, "Miscible blends prepared from two crystalline polymers"—Journal of Polymer Science, Polymer Physics Edition—1983, vol. 21 (2) pp. 233-240.
E.M.Woo, J.W.Barlow, D.R.Paul, "Phase behavior of blends of aliphatic polyesters with a VDC-VC copolymer"—Journal of Applied Polymer Science—1986, vol. 32 (3) pp. 3889-3897.
H. Zhang, RE. Prud'Homme, "Determination of the thermodynamic polymer-polymer interaction parameter of miscible blends prepared from two crystalline polymers"—Journal of Polymer Science, Polymer Physics Edition—1987, vol. 25 (4) pp. 723-738.
H. Li, E. Ruckenstein, "Mutual toughening of VDC and MMA in network composites prepared via concentrated emulsion polymerization"—Polymer—1996, vol. 37 (10) pp. 1933-1940.
G.C. Eastmond, "Blends of vinylidene chloride copolymers (SARAN)"—Advances in Polymer Science—2000, V 149, Ch. 10, pp. 113-115.
PCT International Search Report dated Oct. 23, 2007 for International Application No. PCT/EP2007/059254 (3 p.).
Search Report dated Mar. 23, 2007 from Institut National De La Propriete Industrielle for French Application No. FR06-07798 (2 p.).

* cited by examiner

*Primary Examiner* — Ling Choi
*Assistant Examiner* — Wenwen Cai
(74) *Attorney, Agent, or Firm* — Oblon, Spivak, McClelland, Maier & Neustadt, L.L.P.

(57) ABSTRACT

The present invention relates to a composition of at least one vinylidene chloride polymer, a process for preparing such a composition, a process for preparing articles, in particular films, which includes the use of such a composition and also the film comprising such a composition and the packaging or bag formed from this film.

19 Claims, No Drawings

COMPOSITION OF AT LEAST ONE VINYLIDENE CHLORIDE POLYMER

CROSS-REFERENCE TO RELATED APPLICATIONS

This application is a U.S. national stage application under 35 U.S.C. §371 of International Application No. PCT/EP2007/059254 filed Sep. 4, 2007, which claims priority to French Application No. FR06.07798 filed Sep. 5, 2006, these applications being herein incorporated by reference in their entirety for all purposes.

The present invention relates to a composition of at least one vinylidene chloride polymer, a process for preparing such a composition, a process for preparing articles, in particular films, which includes the use of such a composition and also the film comprising such a composition and the packaging or bag formed from this film.

Vinylidene chloride polymers are known for their remarkable properties as regards permeability to gases and odours. They are frequently used for producing articles, in particular films, used for food and medical packaging.

One disadvantage of vinylidene chloride polymers is that they have a tendency to decompose under the action of heat. It is therefore necessary to consider their thermal stability to avoid this drawback. Their processing is furthermore facilitated if their lubrication is improved by addition of a suitable additive. In so far as certain additives can have an effect on the barrier properties of these polymers, it is nevertheless important to make sure that, after additivation, they have the characteristics required in terms of permeability to gases and odours, in particular to oxygen and to carbon dioxide.

It is also important to make sure that the additives used do not migrate through the polymer matrix or, in the case of multilayer films of which one layer is produced using such a film, between the layers of said films. In the latter case, these compounds could then disadvantageously reach the surface of the film and thus be in contact with the food or medication packaged with this film. Such a situation is not only undesirable from a sanitary viewpoint but is also in contra-indication to most of the regulations in the food and medical packaging field. The foregoing therefore reveals the difficulty which may be presented by the selection of additives to be incorporated into the vinylidene chloride polymers.

Among these, ε-caprolactone polymers are known to have a plasticizing effect on vinylidene chloride polymers. U.S. Pat. No. 3,762,979 thus discloses compositions of a vinylidene chloride polymer containing from 2 to 6% by weight, relative to the weight of the vinylidene chloride polymer, of an ε-caprolactone polymer characterized by a molecular weight varying from 11 400 to 114 000 g/mol, therefore solid at room temperature. These compositions are characterized by an improved processing and adhesive strength when they are used as adhesive materials for woven or non-woven plastics. The compositions may comprise other common plasticizers such as dibutyl sebacate. The latter is nevertheless characterized, in a known manner, by the great disadvantage of migrating into the polymer matrix and is not really recommended. This document does not mention anywhere the characteristics of the compositions in terms of oxygen and carbon dioxide barrier or thermal stability.

Therefore, there remains a need to obtain a composition of at least one vinylidene chloride polymer that is characterized by a high thermal stability and which allows films to be produced that are characterized by the required properties in terms of oxygen and carbon dioxide barrier, in particular which are characterized by a better stability of the barrier over time and which moreover do not have an additive migration problem.

One subject of the present invention is thus a vinylidene chloride polymer composition comprising:
(A) at least one vinylidene chloride polymer;
(B) from 1 to 50% by weight, relative to the total weight of the composition, of at least one ε-caprolactone polymer, of which at least one is characterized by a molecular weight less than or equal to 10 000 g/mol; and
(C) from 0.1 to 7% by weight, relative to the total weight of the composition, of epoxidized soybean oil.

The expression "at least one vinylidene chloride polymer" is understood to mean that the composition comprises one or more of them. Preferably, it comprises only one of them.

The expression "vinylidene chloride polymer" is understood to mean vinylidene chloride homopolymers and also copolymers. The vinylidene chloride polymer according to the invention is advantageously a vinylidene chloride copolymer.

The expression "vinylidene chloride copolymer" is understood to mean copolymers of vinylidene chloride, which is the main monomer, with at least one comonomer with which it is copolymerizable.

Among the comonomers that are copolymerizable with vinylidene chloride, mention may be made, non-limitingly, of vinyl chloride, vinyl esters such as for example vinyl acetate, vinyl ethers, acrylic acids, esters and amides, methacrylic acids, esters and amides, acrylonitrile, methacrylonitrile, styrene, styrene derivatives, butadiene, olefins such as for example ethylene and propylene, itaconic acid and maleic anhydride, but also copolymerizable surfactants such as 2-acrylamido-2-methylpropanesulphonic acid (AMPS) or one of its salts, for example the sodium salt, 2-sulphoethylmethacrylic acid (2-SEM) or one of its salts, for example the sodium salt, and the phosphate ester of methacrylate-terminated polypropylene glycol (such as the product SIPOMER PAM-200 from Rhodia) or one of its salts, for example the sodium salt.

The vinylidene chloride polymer according to the invention is preferably a copolymer composed of vinylidene chloride in an amount of at least 50 wt % and at least one comonomer chosen from vinyl chloride and/or at least one monomer chosen from maleic anhydride, itaconic acid and (meth) acrylic monomers corresponding to the general formula:

$$CH_2=CR_1R_2$$

in which $R_1$ is chosen from hydrogen and the methyl radical and $R_2$ is chosen from the —CN radical and the —CO—$R_3$ radical in which $R_3$ is chosen from the —OH radical, —O—$R_4$ radicals with $R_4$ chosen from the linear or branched alkyl radicals containing from 1 to 18 carbon atoms optionally bearing one or more —OH radicals, the epoxyalkyl radicals containing from 2 to 10 carbon atoms and the alkoxyalkyl radicals containing a total of 2 to 10 carbon atoms and finally $R_4$ is also chosen from the —$NR_5R_6$ radicals in which $R_5$ and $R_6$, which are the same or different, are chosen from hydrogen and the alkyl radicals containing from 1 to 10 carbon atoms, optionally bearing one or more —OH radicals, the aforementioned copolymerizable surfactants and the phosphate ester of methacrylate-terminated polypropylene glycol or one of its salts, for example the sodium salt.

The vinylidene chloride polymer according to the invention is particularly preferably a copolymer composed of vinylidene chloride in an amount of at least 50 wt % and at least one comonomer chosen from vinyl chloride and/or at least one monomer chosen from the (meth)acrylic monomers corresponding to the general formula:

in which $R_1$ is chosen from hydrogen and the methyl radical and $R_2$ is the —CO—$R_3$ radical in which $R_3$ is chosen from the —OH radical, —O—$R_4$ radicals with $R_4$ chosen from linear or branched alkyl radicals containing from 1 to 18 carbon atoms optionally bearing one or more —OH radicals, epoxyalkyl radicals containing from 2 to 10 carbon atoms and alkoxyalkyl radicals containing a total of 2 to 10 carbon atoms.

The vinylidene chloride polymer according to the invention is more particularly preferably a copolymer composed of vinylidene chloride in an amount of at least 50 wt % and at least one comonomer chosen from the (meth)acrylic monomers corresponding to the general formula:

in which $R_1$ is chosen from hydrogen and the methyl radical and $R_2$ is the —CO—$R_3$ radical in which $R_3$ is chosen from the —OH radical and —O—$R_4$ radicals with $R_4$ chosen from linear or branched alkyl radicals containing from 1 to 18 carbon atoms optionally bearing one or more —OH radicals, epoxyalkyl radicals containing from 2 to 10 carbon atoms and alkoxyalkyl radicals containing a total of 2 to 10 carbon atoms.

Among the comonomers corresponding to the general formula:

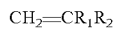

mention may be made of methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylic acid and methacrylic acid.

The vinylidene chloride polymer according to the invention is most particularly preferably a copolymer composed of vinylidene chloride in an amount of at least 50 wt % and at least one comonomer chosen from methyl acrylate, methyl methacrylate, ethyl acrylate, ethyl methacrylate, n-butyl acrylate, n-butyl methacrylate, 2-ethylhexyl acrylate and 2-ethylhexyl methacrylate.

One vinylidene chloride polymer according to the invention that gives very good results is a copolymer composed of vinylidene chloride in an amount of at least 50 wt % and methyl acrylate.

Advantageously, the amount of vinylidene chloride in the vinylidene chloride copolymers varies from 50 to 95 wt %, preferably from 60 to 95 wt %, particularly preferably from 70 to 95 wt % and more particularly preferably from 80 to 95 wt %.

Advantageously, the amount of vinyl chloride in the vinylidene chloride copolymers varies from 0.5 to 50 wt %, preferably from 5 to 40 wt %, particularly preferably from 5 to 30 wt % and more particularly preferably from 5 to 20 wt %.

Advantageously, the amount of methyl acrylate in the vinylidene chloride copolymers varies from 5 to 50 wt %, preferably from 5 to 40 wt %, particularly preferably from 5 to 30 wt % and more particularly preferably from 5 to 20 wt %.

Besides (A), (B) and (C), the composition according to the invention may comprise other compounds. Among these, mention may be made of the heat stabilizers, colorants, UV stabilizers, mineral fillers, lubricants or processing aids, antioxidants and chlorine or oxygen scavengers commonly used.

Preferably, the vinylidene chloride polymer composition according to the invention mainly consists of:
(A) at least one vinylidene chloride polymer;
(B) from 1 to 50% by weight, relative to the total weight of the composition, of at least one ε-caprolactone polymer, of which at least one is characterized by a molecular weight less than or equal to 10 000 g/mol; and
(C) from 0.1 to 7% by weight, relative to the total weight of the composition, of epoxidized soybean oil.

The expression "mainly consists of" is understood to mean that, besides the principal compounds (A), (B) and (C), the composition according to the invention only comprises compounds present in trace amounts and that do not have an effect on the properties of the composition.

In this case, (A) is also preferably composed of a single vinylidene chloride polymer.

The expression "ε-caprolactone polymer" is understood to denote both the homopolymers of ε-caprolactone (or 2-oxepanone) and the copolymers of it with at least one other comonomer.

The ε-caprolactone polymers may have a different structure from one another. Thus, they may have a linear or branched structure considering, for example, their method of preparation, in particular the polymerization initiator used. When they have a branched structure, they may especially be in the form of a structure having 3 or even 4 branches. Their chain ends may be hydroxyl groups or else carboxylic groups.

Depending on their molecular weight, the ε-caprolactone polymers may be in the form of a solid (as powder or granules), in the form of a viscous product (paste, wax, etc.) or in the form of a liquid at room temperature.

Generally, the ε-caprolactone polymers whose molecular weight is greater than 10 000 g/mol are in solid form at room temperature whereas those whose molecular weight is less than or equal to 10 000 g/mol are instead in the form of a viscous product or a liquid.

The expression "molecular weight" is understood to mean the number-average molecular weight.

The ε-caprolactone polymers whose molecular weight is greater than 10 000 g/mol are preferably characterized by a molecular weight greater than or equal to 15 000 g/mol, particularly preferably greater than or equal to 20 000 g/mol. These same polymers are preferably characterized by a molecular weight less than or equal to 100 000 g/mol, particularly preferably less than or equal to 80 000 g/mol.

In the composition according to the invention, at least one ε-caprolactone polymer is characterized by a molecular weight less than or equal to 10 000 g/mol, preferably less than or equal to 9000 g/mol, particularly preferably less than or equal to 8500 g/mol and more particularly preferably less than or equal to 8000 g/mol. This or these polymers are preferably characterized by a molecular weight greater than or equal to 150 g/mol, particularly preferably greater than or equal to 200 g/mol.

The ε-caprolactone polymers whose molecular weight is less than or equal to 10 000 g/mol are preferably characterized by a viscosity less than or equal to 9500, particularly preferably less than or equal to 8000, more particularly preferably less than or equal to 7000 and most particularly preferably less than or equal to 5000 mPa·s at 60° C.

Some ε-caprolactone polymers that are particularly well suited for the composition according to the invention are the ε-caprolactone polymers sold by Solvay Interox Limited under the trademark CAPA®.

The expression "at least one ε-caprolactone polymer, of which at least one is characterized by a molecular weight less than or equal to 10 000 g/mol" is understood to mean that the composition may comprise one or more ε-caprolactone polymers but of which at least one is characterized by a molecular weight less than or equal to 10 000 g/mol.

Thus, besides an ε-caprolactone polymer characterized by a molecular weight less than or equal to 10 000 g/mol, other ε-caprolactone polymers are characterized either by a molecular weight less than or equal to 10 000 g/mol, or by a molecular weight greater than 10 000 g/mol, may be present in the composition. In the case where at least one polymer having a molecular weight greater than 10 000 g/mole is present in the composition, their amount does not advantageously exceed 50% and preferably not 45% of the total weight of ε-caprolactone polymer(s).

The total amount of ε-caprolactone polymer(s) in the composition according to the invention is between 1 and 50% by weight relative to the total weight of the composition.

The total amount of ε-caprolactone polymer(s) is at least 1, preferably at least 2, and particularly preferably at least 3% by weight relative to the total weight of the composition.

The total amount of ε-caprolactone polymer(s) is at most 50, preferably at most 30, particularly preferably at most 20, and more particularly preferably at most 15% by weight relative to the total weight of the composition.

A total amount of ε-caprolactone polymer(s) between 3 and 15% by weight relative to the total weight of the composition is most particularly preferred.

The amount of epoxidized soybean oil in the composition according to the invention is between 0.1 and 7% by weight relative to the total weight of the composition.

The amount of epoxidized soybean oil is at least 0.1, preferably at least 0.2, particularly preferably at least 0.5, more particularly preferably at least 1 and most particularly preferably at least 1.5% by weight relative to the total weight of the composition.

The amount of epoxidized soybean oil is at most 7, preferably at most 6, particularly preferably at most 5, more particularly preferably at most 4 and most particularly preferably at most 2.5% by weight relative to the total weight of the composition.

A total amount of epoxidized soybean oil between 1.5 and 2.5% by weight relative to the total weight of the composition is most particularly preferred.

The composition according to the invention may be prepared by any preparation process. Thus, it may be prepared by incorporating (B) and (C) into (A) during the preparation of (A) by polymerization of the constituent monomers of (A). Thus, during the preparation of the vinylidene chloride polymer by polymerization of vinylidene chloride and at least one comonomer that is copolymerizable with it, at least one ε-caprolactone polymer, preferably preformed in a medium other than that of the vinylidene chloride polymerization, is advantageously added. The ε-caprolactone polymer(s) may be introduced either at the same time as the raw materials needed for the polymerization and also optionally at least one additive, or when the residual monomers are removed from the slurry obtained after reaction, with optional addition of at least one additive. One particularly beneficial additive is epoxidized soybean oil.

According to one preferred variant, the ε-caprolactone polymer(s) are introduced at the same time as the raw materials needed for the polymerization and also at least one additive. Particularly preferably, a single ε-caprolactone polymer is introduced at the same time as the raw materials and at least one additive.

The ε-caprolactone polymer(s), the raw materials and the additive(s) are introduced in any order. Thus, the ε-caprolactone polymer(s) may be introduced after the water, the radical generator(s), the dispersant(s), before the vinylidene chloride and the comonomer(s) with which it is copolymerizable and before, after or as a mixture with the additive(s). They may, in addition, be introduced after the water, before the radical generator(s), the dispersant(s) and the vinylidene chloride and the comonomer(s) with which it is copolymerizable and before, after or as a mixture with the additive(s). They may, in addition, be introduced after the radical generator(s), before the vinylidene chloride and the comonomer(s) with which it is copolymerizable, the water, and the dispersant(s) and before, after or as a mixture with the additive(s). They may also be introduced after the water, the radical generator(s), the dispersant(s) and optionally at least some of the comonomer(s) copolymerizable with the vinylidene chloride and as a premix with the additive(s), at least some of the vinylidene chloride and optionally at least some of the comonomer(s) with which it is copolymerizable; the possible balance of the vinylidene chloride then being introduced after the premix.

The ε-caprolactone polymer(s) may therefore be introduced independently or as a mixture with one or more of the additives, but also as a mixture with one or more of the additives and at least some of the monomers (vinylidene chloride and/or the comonomer(s) with which it is polymerizable). The latter case is particularly advantageous.

The composition according to the invention may also be prepared by mixing (A), (B) and (C) via premixing or by mixing (A) containing (C), and (B) via premixing. It may also be prepared by mixing (A) with some of (B), and (C) and then adding the balance of (B) via premixing.

Another subject of the present invention is therefore a process for preparing a composition according to the invention characterized in that it comprises the mixing of (A), (B) and (C) via premixing.

Another subject of the present invention is a process for preparing a composition according to the invention characterized in that it comprises the mixing of (A) containing (C), and (B) via premixing. (C) is thus advantageously mixed with (A) before (B) is added to them via premixing. (C) is preferably mixed with (A) during the preparation of (A) by polymerization of vinylidene chloride and the comonomer(s) with which it is copolymerizable.

Another subject of the present invention is a process for preparing a composition according to the invention characterized in that it comprises the mixing of (A) with some of (B), and (C) and then addition of the balance of (B) via premixing. Some of (B), and (C) are thus advantageously mixed with (A) before the balance of (B) is added to them via premixing Some of (B), and (C) are preferably mixed with (A) during the preparation of (A) by polymerization of vinylidene chloride and the comonomer(s) with which it is copolymerizable, as explained previously.

The process for preparing a composition according to the invention characterized in that it comprises the mixing of (A) containing (C), and (B) via premixing and this characterized in that it comprises the mixing of (A) with some of (B), and (C) and then addition of the balance of (B) via premixing are preferred. The process for preparing a composition according to the invention characterized in that it comprises the mixing of (A) containing (C), and (B) via premixing is particularly preferred.

The term "premixing" is understood to mean any method that includes the use of a mixer and that makes it possible to carry out the mixing of the various components of the composition according to the invention.

A first preferred method uses a double-chamber rapid mixer. Thus, (1) all of the (A) and optionally some of the solid additives are advantageously introduced into a first heated and stirred chamber. (2) The liquid additive(s) and/or ε-caprolactone polymer(s), temperature-conditioned in a subsidiary reservoir, are then advantageously introduced when the temperature in the hot chamber reaches the target value. The solid additive(s) may also be introduced during this step. (3) Once the temperature is reached, the mixture is then advantageously transferred into a second cold chamber, also with stirring and which has a jacket in which low-temperature water circulates. (4) The mixture advantageously continues to be stirred to an established temperature. During this phase, one or some of the solid additives and/or ε-caprolactone polymers may also be added, preferably at the beginning of step (4). (5) Once the contents of the chamber are cooled, the chamber is emptied.

A second method advantageously uses a slow mixer of the Patterson CONAFORM® type, composed of a single jacketed chamber, into which vapour may be injected, having a slow rotation and possibly being under vacuum. The steps are quite similar to those of the first method, with introduction of (A) and optionally some of the solid additives before heating the chamber, addition of preheated liquid additive(s), when a certain temperature is reached and after homogenization at a defined temperature and for a certain time period, and finally start of the cooling phase during which it is still possible to introduce one or some solid additive(s).

One preferred variant of the preferred process for preparing a vinylidene chloride polymer composition according to the invention comprising the mixing of (A) containing (C), preferably mixed with (A) during the preparation of (A) by polymerization of vinylidene chloride and the comonomer(s) with which it is copolymerizable, and (B) via premixing, preferably consists in:

(1) introducing all of (A) containing (C) into a first heated and stirred chamber;
(2) introducing the ε-caprolactone polymer(s) characterized by a molecular weight less than or equal to 10 000 g/mol constituting (B), temperature-conditioned in a subsidiary reservoir, when the temperature in the hot chamber has reached the target value;
(3) once the temperature is reached, transferring the mixture into a second cold chamber, with stirring and which has a jacket in which low-temperature water circulates;
(4) optionally introducing the other ε-caprolactone polymer(s) constituting (B) and continuing to stir the mixture to an established temperature; and
(5) once the contents of the chamber are cooled, discharging them.

Another subject of the present invention is a process for preparing articles which includes the use of a composition according to the invention.

The articles may be films, foils, sheets, single-layer or multilayer films or moulded objects. Preferably, the articles are single-layer or multilayer films. These may or may not be retractable.

Another subject of the present invention is a single-layer or multilayer film which comprises a composition according to the invention.

The single-layer or multilayer film preferably comprises a barrier layer comprising a composition according to the invention.

The film according to the invention may be a cast film or a blow-moulded film. It may or may not be retractable.

Finally, a subject of the present invention is a packaging or bag formed from a film according to the invention.

The packaging or bag may be intended for any use. Preferably, it is intended for food packaging or medical use.

When it is intended for food packaging, it is preferably intended for packaging cheese or other foods.

When it is intended for medical use, it is preferably intended for producing ostomy pouches.

Particularly preferably, it is intended for food packaging. More particularly preferably, it is intended for cheese packaging.

The vinylidene chloride polymer composition according to the invention has the advantage of being characterized by the required properties in terms of thermal stability and of giving rise to the formation of films that are characterized by the required properties in terms of oxygen and carbon dioxide barrier, in particular which are characterized by a good compromise between the carbon dioxide barrier and that of oxygen and also a better stability of the oxygen barrier over time.

The following examples are intended to illustrate the invention without however limiting the scope thereof.
Determination of the Amount of ε-Caprolactone Polymer(s)

The amount of ε-caprolactone polymer(s) in the composition of a vinylidene chloride polymer was determined by mass balance or by integration of the proton NMR spectrum of the composition dissolved in trichlorobenzene and using octamethylcyclotetrasiloxane as an internal standard.
Determination of the Amount of Epoxidized Soybean Oil The amount of epoxidized soybean oil in the composition of a vinylidene chloride polymer was determined by mass balance or by thin layer chromatography using an epoxidized soybean oil standard. The sample subjected to chromatography was obtained by dissolving the composition of a vinylidene chloride polymer in tetrahydrofuran; an operation followed by precipitation into methanol. The precipitated part was then filtered and put back into solution in the tetrahydrofuran before being subjected to a second precipitation. The two soluble fractions were then brought together and concentrated using an evaporator. The concentrate obtained was subjected to the thin layer chromatography. After migration, a developing agent was used and a densitometry measurement was carried out.
Measurement of the Thermal Stability of a Vinylidene Chloride Polymer Composition The principle of the thermal stability measurement consists in processing the vinylidene chloride polymer composition in a mixing chamber so as to analyse its behaviour under stress and in concluding as to its ability to be able to be used in an extrusion machine.

The machine used for the measurement was a Brabender PL2100 Plasti-Corder machine.

In order to carry out the measurement, the hopper positioned above the mixing chamber of the machine was filled with 95 g of the sample. A pressure was exerted over the hopper using a gauge, so that the entirety of the sample was introduced into the mixing chamber. Identification of the torque (Nm) on the force scale could be carried out to stop the pressure on the gauge. The gauge and the hopper were then removed. The introduction of the sample into the mixing chamber constituted the automatic starting point of the test and of the time countdown. The variation of the torque and the material temperature (+/−5° C. with respect to the setpoint) were monitored throughout the duration of the test.

A sample was removed in the 6$^{th}$ minute and every 3 minutes afterwards throughout the duration of the test and this being done until 5 to 10 minutes after the change in the slope of the torque. The material removed was then made into a ball shape and put in a press for one minute. The pellet thus obtained was then cut along the diameter ad hoc using a calibre punch and bonded to the test processing sheet. The decomposition stage was visualized either by a dark brown coloration of the pellet or by a change in the slope of the torque curve. Continuing the test for 5 to 10 minutes allowed an easier and more precise determination of the decomposition point and the corresponding temperature. The thermal stability as determined is therefore the time, expressed in minutes, corresponding to the decomposition point.

Production of Films from a Vinylidene Chloride Polymer Composition

Films were prepared from the vinylidene chloride polymer compositions in question via the examples that follow.

For this, a three-layer film A/B/A (A=ethylene/vinyl acetate polymer ESCORENE® UL2020 from Exxon Mobil, B=vinylidene chloride polymer composition) was produced by coextrusion using two extruders, a feed block with four temperature zones and a 200×0.6 mm sheet die. On exiting the die, the film was cooled and drawn, to a greater or lesser extent, in the machine direction by a 3-roll calender.

For each vinylidene chloride polymer composition tested, seven films with thicknesses varying from 10 to 60 mm were produced by varying the drawing rate of the film.

Half of each of these seven films were stored at below 10° C. in the fridge (hereinafter called fresh films) and the other half were treated for 2 days at 40° C. in an oven and then stored at 23° C. and 50% relative humidity (hereinafter called aged films).

Determination of the Level of Fish Eyes in the Films

The principle of the method consists in classifying the films relative to an internal scale of films having various levels of fish eyes, namely from 1 (no fish eyes) to 5 (very many fish eyes).

For that, the operator examined each film and compared it to the five reference films. Each film was thus given a rating from 1 to 5.

Measurement of the Oxygen Transmission Rate of the Films

The principle of the method consists in determining the amount of oxygen which passes through a film of a vinylidene chloride polymer composition, per unit time and unit area, for a defined temperature and relative humidity.

For this, the film was placed in a cell so that it separates this cell into two. The first part was supplied with oxygen and the second flushed with nitrogen. The oxygen which passed through the film was transported by the nitrogen to the coulometric detector. The latter thus determined the amount of oxygen per unit time. Knowing the surface area of the cell, the amount of oxygen in $cm^3$ per day and per $m^2$ was determined.

The machine used was an OX-TRAN 1000-H HUMIDICON (Mocon) machine, conditioned at 25° C. and 85% relative humidity.

The fresh films were removed from the fridge and placed at 23° C. and 50% relative humidity for 24 h before being placed in the various measurement cells of the machine.

Measurement on the aged films stored at 23° C. and 50% relative humidity were carried out as for the fresh films.

The thickness of layer B of the film was measured before carrying out the measurement of the oxygen transmission rate.

The oxygen transmission rate was measured for the seven films with different thicknesses, produced for each vinylidene chloride polymer composition, thus giving 7 oxygen permeability measurements.

A logarithmic regression of the transmission rate as a function of the thickness was then carried out in order to calculate the transmission rate for a standard thickness of layer B of 10 µm.

The value of the oxygen transmission rate for the fresh films ($PO2_{fresh}$) and that for the aged films ($PO2_{40°,2d}$) were thus determined. The oxygen transmission rate is therefore expressed in $cm^3/m^2$.day.atm for a thickness of 10 µm at 25° C.

The ratio $[(PO2_{fresh}-PO2_{40°,2d})/PO2_{fresh}]\times10$ (in %) (called delta PO2) was also determined.

Rheological Extrusion

The principle of the method consists in passing PVDC, previously melted by an extruder, through a rheology die in order to measure the pressure of the material before and after a defined flow area of 20×2 mm. These pressures and also the torque can thus be measured for a set temperature and screw speed. The material throughput is itself measured by weighing. On the basis of these data, the melt viscosity can be calculated for a given shear rate gradient.

The equipment used consisted of a Brabender PL2100 Plasti-Corder machine, a D30/L20 single-screw extruder with a single-screw profile suitable for the PVDC and a Brabender 20×2 mm rheology die.

The measurement conditions were the following:
temperature profile of the extruder barrel: 148-149-155° C.;
temperature profile of the adapter placed between the extruder and the die: 151° C.;
temperature profile of the die: 152° C.;
temperature of the material at the end of the screw of the extruder: 165° C.; and
screw speed of the extruder: 55 rpm.

The torque expressed in Nm, the material throughput expressed in g/min, the pressure of the material entering the die and the pressure of the material exiting the die were thus recorded and measured.

The shear rate gradient in the die, expressed in $s^{-1}$, could be calculated by applying the formula: throughput (g/min)×0.74 (0.74 being the die factor supplied by the manufacturer).

The melt viscosity, expressed in Pa·s, could also be calculated by applying the formula: [(pressure of the material entering the die−pressure of the material exiting the die)× 1000]/throughput.

ε-Caprolactone Polymers

The ε-caprolactone polymers which were used were:
the CAPA®PL1000 polymer that is in the form of a wax at room temperature (which becomes clear when it is heated slightly) and which is characterized by a linear structure, a molecular weight of 1000 g/mol, a viscosity of 150 mPa·s at 60° C. and a melting point between 30 and 40° C.;
the CAPA®2403 polymer that is in the form of a wax at room temperature and which is characterized by a linear structure, a molecular weight of 4000 g/mol, a viscosity of 1670 mPa·s at 60° C. and a melting point between 55 and 60° C. To facilitate its incorporation during the polymerization of vinylidene chloride, the polymer CAPA®2403 was cryogenically ground beforehand, by first immersing it in liquid nitrogen, after having been cut into pieces of approximately 3 mm, and before then injecting it into a rotary mill (stator/rotor) to obtain a powder of which the particles are characterized by an average diameter between 100 and 700 µm (mean around 500 µm) (CAPA® 2403D polymer).
the CAPA® 4801 polymer that is in the form of a wax at room temperature and which is characterized by a (4 branch) star structure, a molecular weight of 8000 g/mol, a viscosity of 4700 mPa·s at 60° C. and a melting point between 40 and 50° C.; and the CAPA®6503 polymer that is in the form of a powdery solid at room temperature and which is characterized by a linear structure, a molecular weight of 50 000 g/mol, a melting point between 58 and 60° C. and an average particle diameter of less than 300 µm.

EXAMPLES 1 TO 2

According to the Invention

A vinylidene chloride polymer, previously additivated with epoxidized soybean oil during its preparation by polymerization, was mixed via premixing with the CAPA® PL1000 polymer in the manner described below. Compositions characterized by different amounts of epoxidized soybean oil and CAPA® PL1000 polymer were thus produced.

For that, the vinylidene chloride polymer was placed in a chamber at room temperature, stirred at 600 rpm. The temperature of the chamber was then raised to 35° C. When the temperature of 35° C. was reached, the CAPA®PL1000 polymer, preheated to 55° C., was introduced into the chamber. The temperature was then raised to 50° C. When this temperature was reached, the contents of the chamber were discharged to another chamber stirred at 170 rpm and equipped with a jacket in which water circulated allowing the contents of the chamber to be cooled. The temperature of the composition was thus therefore lowered until it was below 30° C. The composition was then recovered.

Several films were then produced from each of these vinylidene chloride polymer compositions obtained in Examples 1 to 2 in the manner described previously.

The amount of epoxidized soybean oil (ESO) and the amount of ε-caprolactone polymer (PCL) in the composition, expressed in % by weight relative to the total weight of the composition, and determined as explained above, are given in Tables 1 and 2. Table 1 also gives the thermal stability data measured on the compositions obtained in Examples 1 to 2 and determined as described previously.

Table 2 itself gives the level of fish eyes, the oxygen transmission rate $PO2_{fresh}$, the oxygen transmission rate $PO2_{40°,2d}$ and the ratio $[(PO2_{fresh}-PO2_{40°,2d})/PO2_{fresh}]\times 100$ (called delta PO2), measured on the films in the manner described above.

EXAMPLE 3

According to the Invention

A vinylidene chloride polymer, previously additivated with epoxidized soybean oil during its preparation by polymerization, was mixed via premixing with the CAPA® PL1000 polymer and with the CAPA®6503 polymer in the following manner. A composition was thus produced.

The vinylidene chloride polymer was placed in a chamber at room temperature, stirred at 600 rpm. The temperature of the chamber was then raised to 35° C. When the temperature of 35° C. was reached, the CAPA®PL1000 polymer, preheated to 55° C., was introduced into the chamber. The temperature was then raised to 50° C. When this temperature was reached, the contents of the chamber were discharged to another chamber stirred at 170 rpm and equipped with a jacket in which water circulates allowing the contents of the chamber to be cooled. The temperature of the composition was thus therefore lowered until it was below 30° C. At that time, the CAPA® 6503 polymer was then added. After stirring for around a few minutes, the composition was then recovered.

Several films were then produced from the vinylidene chloride polymer composition obtained in Example 3 in the manner described previously.

The amount of epoxidized soybean oil (ESO) and the amount of ε-caprolactone polymer (PCL) in the composition, expressed in % by weight relative to the total weight of the composition, and determined as explained above, are given in Tables 1 and 2. Table 1 also gives the thermal stability data measured on the composition obtained in Example 3 and determined as described previously.

Table 2 itself gives the level of fish eyes, the oxygen transmission rate $PO2_{fresh}$, the oxygen transmission rate $PO2_{40°,2d}$ and the ratio $[(PO2_{fresh}-PO2_{40°,2d})/PO2_{fresh}]\times 00$ (called delta PO2), measured on the films in the manner described above.

EXAMPLE 4

Comparative

By way of comparison, films of a vinylidene chloride polymer composition, previously additivated with epoxidized soybean oil during its preparation by polymerization, but to which no ε-caprolactone polymer had been added, were produced in the manner described previously.

The amount of epoxidized soybean oil (ESO) in the composition, expressed in % by weight relative to the total weight of the composition, and determined as explained above, is given in Tables 1 and 2. Table 1 also gives the thermal stability data measured on the composition obtained in Example 4 and determined as described previously.

Table 2 itself gives the level of fish eyes, the oxygen transmission rate $PO2_{fresh}$, the oxygen transmission rate $PO2_{40°,2d}$ and the ratio $[(PO2_{fresh}-PO2_{40°,2d})/PO2_{fresh}]\times 100$ (called delta PO2), measured on the films in the manner described above.

EXAMPLE 5

Comparative

By way of comparison, the vinylidene chloride polymer composition obtained in Example 4 was additivated with an amount of epoxidized soybean oil such that the total amount of it was 8% by weight relative to the total weight of the composition. The additivation was carried out by premixing.

For that, the composition was placed in a chamber at room temperature, stirred at 600 rpm. The temperature of the chamber was then raised to 35° C. When the temperature of 35° C. was reached, the epoxidized soybean oil, preheated to 55° C., was introduced into the chamber. The temperature was then raised to 70° C. When this temperature was reached, the contents of the chamber were discharged to another chamber stirred at 170 rpm and equipped with a jacket in which water circulated allowing the contents of the chamber to be cooled. The temperature of the composition was thus therefore lowered until it was below 30° C. The composition obtained was then recovered.

Several films were then produced using the vinylidene chloride polymer composition obtained in Example 5 in the manner described previously.

The amount of epoxidized soybean oil (ESO) in the composition, expressed in % by weight relative to the total weight of the composition, and determined as explained above, is given in Tables 1 and 2. Table 1 also gives the thermal stability data measured on the composition obtained in Example 5 and determined as described previously.

Table 2 itself gives the level of fish eyes, the oxygen transmission rate $PO2_{fresh}$, the oxygen transmission rate $PO2_{40°,2d}$ and the ratio $[(PO2_{fresh}-PO2_{40°,2d})/PO2_{fresh}]\times100$ (called delta PO2), measured on the films in the manner described above.

TABLE 1

|   | ESO | PCL CAPA ® PL1000 | PCL CAPA ® 6503 | Thermal stability |
|---|---|---|---|---|
| 1 | 2 | 6 | 0 | 18 |
| 2 | 2 | 7 | 0 | 17 |
| 3 | 2 | 7 | 5 | 19 |
| 4 | 2 | 0 | 0 | 13 |
| 5 | 8 | 0 | 0 | 15 |

It can be observed that the thermal stability measured on the compositions obtained in Examples 1 and 2 according to the invention is greater than that measured for the composition obtained in comparative Example 5 whereas the amount of ESO+PCL from Examples 1 and 2 is equivalent to that of ESO from Example 5. The comparison of the comparative Examples 4 and 5 reveals that an increase in the amount of ESO makes it possible to improve the thermal stability of the composition obtained without however reaching the values measured for the compositions comprising PCL.

TABLE 2

|   | ESO | PCL CAPA ® PL1000 | PCL CAPA ® 6503 | Level of fish eyes | $PO2_{fresh}$ | $PO2_{40°,2d}$ | delta PO2 |
|---|---|---|---|---|---|---|---|
| 1 | 2 | 6 | 0 | 1 | 91 | 79 | 13 |
| 2 | 2 | 7 | 0 | 2 | 108 | 94 | 13 |
| 3 | 2 | 7 | 5 | 2 | 309 | 304 | 2 |
| 4 | 2 | 0 | 0 | 1 | 16 | 11 | 31 |
| 5 | 8 | 0 | 0 | 2 | 78 | 55 | 29 |

It can therefore be observed that the films obtained according to the examples according to the invention are characterized by a delta PO2 below 25% whereas the films obtained according to the comparative examples are characterized by a delta PO2 above this value. They are therefore characterized by a better stability of the oxygen barrier over time than the films obtained according to the comparative examples from a composition that did not contain any ε-caprolactone polymer.

EXAMPLE 6

According to the Invention

A vinylidene chloride polymer, previously additivated with epoxidized soybean oil during its preparation by polymerization, was mixed via premixing with the CAPA®4801 polymer in the same way as in Example 1 according to which the vinylidene chloride polymer was mixed with the CAPA®PL 1000 polymer although only the CAPA®4801 polymer had been preheated to 95° C. A composition was thus produced.

The amount of epoxidized soybean oil (ESO) and the amount of ε-caprolactone polymer (PCL) in the composition, expressed in % by weight relative to the total weight of the composition, and determined as explained above, are given in Table 3. Table 3 also gives the rheology data measured on the composition obtained in Example 6 and determined as described previously.

EXAMPLE 7

Comparative

A vinylidene chloride polymer was mixed via premixing with epoxidized soybean oil and with the CAPA®6503 polymer in the following manner. A composition was thus produced.

The vinylidene chloride polymer was placed in a chamber at room temperature, stirred at 600 rpm. The temperature of the chamber was then raised to 35° C. When the temperature of 35° C. was reached, the epoxidized soybean oil, preheated to 55° C., was introduced into the chamber. The temperature was then raised to 70° C. When this temperature was reached, the contents of the chamber were discharged to another chamber stirred at 170 rpm and equipped with a jacket in which water circulates allowing the contents of the chamber to be cooled. The temperature of the composition was thus therefore lowered until it was below 30° C. At that time, the CAPA®6503 polymer was then added. After stirring for around a few minutes, the composition was then recovered.

The amount of epoxidized soybean oil (ESO) and the amount of ε-caprolactone polymer (PCL) in the composition, expressed in % by weight relative to the total weight of the composition, and determined as explained above, are given in Table 3. Table 3 also gives the rheology data measured on the composition obtained in Example 7 and determined as described previously.

Table 3 moreover gives the rheology data measured for the compositions obtained in Examples 1 and 4.

TABLE 3

|   | ESO | PCL | Torque (Nm) | Throughput (kg/h) | Shear rate ($s^{-1}$) | Melt viscosity (Pa·s) |
|---|---|---|---|---|---|---|
| 6 | 2 | 6[1] | 80 | 7.3 | 90 | 1216 |
| 7 | 2 | 6[2] | 96 | 7.2 | 88 | 1697 |
| 1 | 2 | 6[3] | 73 | 7.1 | 87 | 1132 |
| 4 | 2 | 0 | 101 | 7.3 | 89 | 1784 |

[1]PCL CAPA ® 4801
[2]PCL CAPA ® 6503
[3]PCL CAPA ® PL1000

It can therefore be observed that the compositions according to the invention comprising at least one ε-caprolactone polymer characterized by a molecular weight less than or equal to 10 000 g/mol (Examples 1 to 6) are characterized by a torque and a melt viscosity that are significantly lower than the compositions according to the prior art comprising an ε-caprolactone polymer characterized by a molecular weight greater than 10 000 g/mol (Example 7) or that do not comprise an ε-caprolactone polymer (Example 4).

EXAMPLE 8

According to the Invention

Introduced into a carboy were 9600 g of vinylidene chloride, 320 g of epoxidized soybean oil DRAPEX 392 and 1232 g of the CAPA®2403D polymer. The premix was then stirred and left at room temperature for around 1 h 30 min to allow the epoxidized soybean oil and CAPA®2403D polymer to completely dissolve, which was achieved when particles could no longer be seen in dispersion in the mixture which was then characterized by a clear appearance.

Introduced into a 40 litre autoclave with mechanical stirring at 160 rpm and equipped with a jacket, the temperature of which was set at 15° C., were 21 760 g of demineralized water. Introduced next were 160 g of dilauroyl peroxide and 2080 cm³ of a methyl hydroxypropyl cellulose solution. The autoclave was then deaerated. 1339 g of methyl acrylate were then introduced into the autoclave, followed by the vinylidene chloride/epoxidized soybean oil/CAPA®2403D polymer premix and finally 5061 g of vinylidene chloride.

After introducing the monomers, the autoclave was heated to 72° C. The polymerization reaction was continued until the desired degree of conversion was reached, as indicated by a pressure drop in the autoclave.

Before opening the reactor, the residual monomers were removed by stripping of the slurry formed. Thus, the stripping was carried out under vacuum (−0.8 bar) at a temperature of 75° C. for 5 h. The autoclave was then cooled and drained.

A slurry purified of the residual monomers was recovered, which was then filtered. The cake obtained was then washed by spraying with water and finally dried under a fluidized bed to obtain a vinylidene chloride polymer. The yield was 99.7% by weight.

The amount of epoxidized soybean oil (ESO) and the amount of ϵ-caprolactone polymer (PCL) in the composition, expressed in % by weight relative to the total weight of the composition, and determined as explained above, are given in Table 4. Table 4 also gives the thermal stability data measured on the composition obtained in Example 8 and determined as described previously.

EXAMPLE 9

Comparative

A vinylidene chloride polymer, previously additivated with epoxidized soybean oil during its preparation by polymerization, was mixed via premixing with the CAPA®6503 polymer in the manner described below. A composition was thus produced.

For that, the vinylidene chloride polymer was placed in a chamber at room temperature, stirred at 170 rpm and equipped with a jacket in which water circulated allowing the contents of the chamber to be cooled below 30° C. The CAPA®6503 polymer was then added. After stirring for around a few minutes, the composition was then recovered.

The amount of epoxidized soybean oil (ESO) and the amount of ϵ-caprolactone polymer (PCL) in the composition, expressed in % by weight relative to the total weight of the composition, and determined as explained above, are given in Table 4. Table 4 also gives the thermal stability data measured on the composition obtained in Example 9 and determined as described previously.

TABLE 4

| | ESO | PCL | Thermal stability |
|---|---|---|---|
| 8 | 2 | 7[(4)] | 15 |
| 9 | 2 | 7[(2)] | <7 |

[(4)]PCL CAPA ® 2403D
[(2)]PCL CAPA ® 6503

It can therefore be observed that the compositions according to the invention comprising at least one ϵ-caprolactone polymer characterized by a molecular weight less than or equal to 10 000 g/mol (Example 8) are characterized by a better thermal stability than the compositions according to the prior art comprising an ϵ-caprolactone polymer characterized by a molecular weight greater than 10 000 g/mol (Example 9).

The invention claimed is:

1. A vinylidene chloride polymer composition, comprising:
    (A) at least one vinylidene chloride polymer;
    (B) from 1 to 50% by weight, relative to the total weight of the composition, of at least one ϵ-caprolactone polymer; and
    (C) from 0.1 to 7% by weight, relative to the total weight of the composition, of epoxidized soybean oil,
    wherein said at least one ϵ-caprolactone polymer comprises at least one ϵ-caprolactone polymer that has a number average molecular weight less than or equal to 10,000 g/mol and at least one ϵ-caprolactone polymer that has a number average molecular weight greater than 10,000 g/mol, the at least one ϵ-caprolactone polymer that has a number average molecular weight greater than 10,000 g/mol being present in an amount less than 50% of the total weight of ϵ-caprolactone polymers.

2. The composition of claim 1, comprising a single vinylidene chloride polymer.

3. The composition of claim 2, wherein the vinylidene chloride polymer is a copolymer comprising vinylidene chloride in an amount of at least 50 wt % and at least one (meth) acrylic comonomer of formula (I):

$$CH_2=CR_1R_2 \qquad (I),$$

wherein
    $R_1$ is hydrogen or a methyl radical; and
    $R_2$ is an —CO—$R_3$ radical wherein $R_3$ is —OH or —O—$R_4$, wherein $R_4$ is at least one selected from the group consisting of a linear or branched alkyl radical comprising from 2 to 10 carbon atoms, optionally bearing one or more —OH radicals, an epoxyalkyl radical comprising from 2 to 10 carbon atoms, and an alkoxyalkyl radical comprising a total of 2 to 10 carbon atoms.

4. The composition of claim 3, wherein the vinylidene chloride polymer is a copolymer comprising vinylidene chloride in an amount of at least 50 wt % and methyl acrylate.

5. The composition of claim 1, consisting essentially of:
    (A) at least one vinylidene chloride polymer;
    (B) from 1 to 50% by weight, relative to the total weight of the composition, of at least one ϵ-caprolactone polymer; and
    (C) from 0.1 to 7% by weight, relative to the total weight of the composition, of epoxidized soybean oil,
    wherein said at least one ϵ-caprolactone polymer consists essentially of at least one ϵ-caprolactone polymer that has a number average molecular weight less than or equal to 10,000 g/mol and at least one ϵ-caprolactone polymer that has a number average molecular weight greater than 10,000 g/mol, the at least one ϵ-caprolactone polymer that has a number average molecular weight greater than 10,000 g/mol being present in an amount less than 50% of the total weight of ϵ-caprolactone polymers.

6. The composition of claim 1, wherein at least one ϵ-caprolactone polymer has a molecular weight less than or equal to 8,500 g/mol.

7. The composition of claim 1, wherein a total amount of ϵ-caprolactone polymers is between 3 and 15% by weight relative to the total weight of the composition.

8. The composition of claim 1, which comprises the mixture of (A), (B) and (C) via premixing.

9. A single-layer or multilayer film, comprising the composition of claim 1.

10. A single-layer or multilayer film, comprising a barrier layer comprising the composition of claim 1.

11. A packaging or bag, formed from the film of claim 9.

12. The packaging or bag of claim 11, suitable for food packaging or medical application.

13. The packaging or bag of claim 12, suitable for cheese packaging.

14. The composition of claim 1, wherein a total amount of ε-caprolactone polymers is between 1 and 30% by weight, relative to the total weight of the composition.

15. The composition of claim 1, wherein at least one ε-caprolactone polymer has a molecular weight greater than or equal to 150 g/mol.

16. The composition of claim 5, wherein at least one ε-caprolactone polymer has a molecular weight less than or equal to 8,500 g/mol.

17. The composition of claim 1, wherein said at least one ε-caprolactone polymer comprises at least one ε-caprolactone polymer that has a number average molecular weight that is less than or equal to 8,000 g/mol and more than 200 g/mol and at least one ε-caprolactone polymer that has a number average molecular weight that is greater than 20,000 g/mol and less than 80,000 g/mol.

18. The composition of claim 17, comprising from 3 to 15% by weight, relative to the total weight of the composition, of said at least one ε-caprolactone polymer.

19. The composition of claim 5, wherein said at least one ε-caprolactone polymer consists essentially of at least one ε-caprolactone polymer that has a number average molecular weight that is less than or equal to 8,000 g/mol and more than 200 g/mol and at least one ε-caprolactone polymer that has a number average molecular weight that is greater than 20,000 g/mol and less than 80,000 g/mol.

* * * * *